United States Patent Office 3,120,444
Patented Feb. 4, 1964

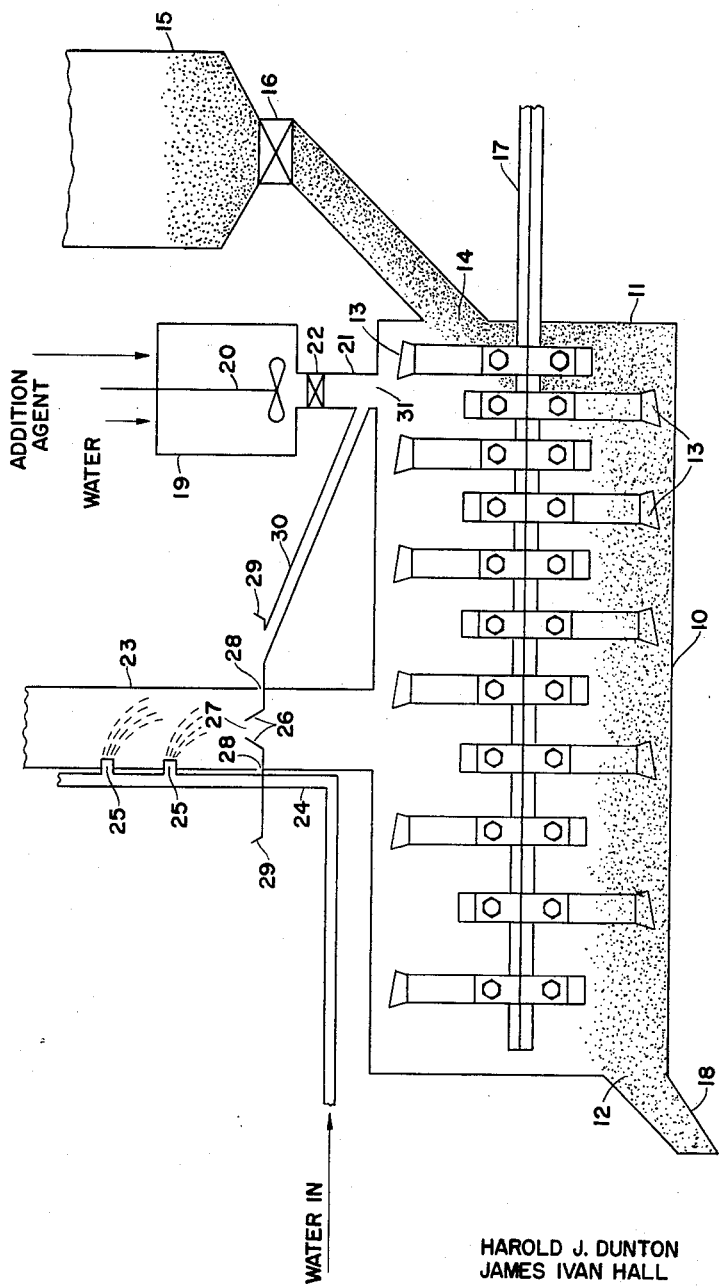
HAROLD J. DUNTON
JAMES IVAN HALL
INVENTORS

3,120,444
HYDRATED LIME AND METHOD OF MAKING
THE SAME
Harold J. Dunton and James Ivan Hall, Salinas, Calif.,
assignors to Kaiser Aluminum & Chemical Corporation,
Oakland, Calif., a corporation of Delaware
Filed May 31, 1961, Ser. No. 113,926
16 Claims. (Cl. 106—119)

This invention relates to the production of a plastic hydrated lime and to the hydrated lime so produced.

Among the materials used in the building of dwellings and other structures, and especially in the construction of ceilings and interior walls, hydrated lime has occupied an important place for a very long time. Such lime has often been used to form mortars, plasters and stuccos which are then trowelled on or otherwise applied to the walls or ceilings or surfaces to be covered. In use in building construction, the procedure has been to prepare a dry lime hydrate, which has been sold as such. At the site of use this hydrate is mixed with the desired amount of water to form a plaster or the like, and is then aged, or allowed to stand, for from twelve to twenty-four hours, or at least overnight, in order to develop the proper plasticity or workability. The aged hydrate is then mixed with aggregate, usually sand, and is ready for application to the surface to be finished. It can be seen that the sand-carrying capacity, that is, the ability to form a smooth, homogeneous mixture with large amounts of sand or other aggregate, is also very important.

In this art, therefore, in using lime hydrate, or hydrated lime, as a stucco or the like, there are two water-treatment steps or stages. In the first step, an active, calcined lime, CaO, is mixed with at least sufficient water to form the hydrate, of which the chemical formula is believed to be $Ca(OH)_2$. This material as sold and shipped is a dry product, usually a powder. In the second step, a further amount of water is added to make a so-called "lime putty," which must be smooth, plastic, workable with a trowel or the like, and of good consistency capable of holding the desired amount of sand or other aggregate. The first step apparently involves a simple chemical hydration, but the mechanism of the second step is not understood, except that upon mixing with water in the second stage a considerable standing or aging time is required with the normal lime hydrate, whereupon the mass stiffens to a gel consistency, but can be worked, as on a mason's mortar board, and can be spread on the surface to be treated where it again eventually sets up and dries, forming the desired plaster or stucco coat.

It has long been desired to reduce the aging time of such hydrates, and especially to do so in an economical and simple manner. Some prior art methods of producing a lime hydrate which upon admixture with water very rapidly attains its desired plasticity, workability and sand-carrying capacity have involved hydration under increased steam pressure, which requires special apparatus and increases the cost both in capital investment for equipment, and in operation of the process.

According to the present invention a hydrated lime is prepared by a simple and inexpensive hydration treatment of active lime, and the hydrated lime so prepared requires only a very short aging time, exhibits improved plasticity and has excellent sand-carrying capacity. It is to be understood that the term "lime" is intended to include dolomitic limes, high magnesia limes and high calcium limes.

In the annexed drawing there is shown a device suitable for carrying out one embodiment of the method of this invention.

Active lime, by the method of the present invention, is hydrated by admixing with at least sufficient water to form the hydrate and with the admixture also of a small amount of at least one water-soluble substance chosen from the group consisting of a lower molecular weight aliphatic alcohol, glycerol and resin alcohol, and the whole is thoroughly mixed and allowed to stand until hydration is effected. Preferably, an excess of water is employed in order to maintain a lower temperature, because the hydration reaction is exothermic and the additive might tend to vaporize off or be deleteriously affected under too high temperatures. In a preferred procedure there is admixed from 0.0005% to 10% of such water-soluble substance, as will be further explained below.

The lower molecular weight aliphatic alcohols useful herein are those which are water-soluble and in general, such alcohol contains not over eight carbon atoms. Good results are obtained, for example, by admixing in the above described process a small amount of methyl, ethyl or isopropyl alcohol. When methanol or methyl alcohol is employed there should be admixed from 0.75% to 4% thereof, based on the weight of dry, unhydrated lime treated, or in other words, about 0.5% to 3.0% based on the weight of dry hydrate produced. When using ethyl alcohol, or ethanol, it is preferred to admix at least 1.5% thereof and very good results have been obtained when 10% is admixed, based on the unhydrated lime; or there can be used about 1.0% to 7.5% based on the hydrate produced. Glycerol has proved to be an excellent additive, and is suitably added in an amount of from 0.15% to 5%, and preferably in an amount of from 0.15% to 2.5% based on unhydrated lime, or 0.1% to 3.75%, preferably about 0.1% to 2%, based on hydrated material. Glycerol withstands well the heating effect upon hydration and provides thick, very plastic white putties upon admixture of the hydrated lime with water. A resin alcohol such as polyvinyl alcohol is very effective addition agent in the present invention and is preferably added in an amount of from 0.0005% to 0.005%. Mixtures of these addition agents with each other can be employed, if desired.

In preparing the hydrate according to this invention, the addition agent is preferably first admixed or dissolved in at least part of the water to be employed in hydration and this solution is then mixed with the active lime. In another manner of operation, the additive, especially if a dry powder, is admixed with the dry calcined lime and then the water of hydration is added, but it is preferred to mix the additive with the water, as described above, in order to obtain most intimate and homogeneous admixture.

The annexed drawing shows in schematic form a device suitable for carrying out one embodiment of the present invention. The device comprises a generally tubular drum 10, generally horizontal, and containing mixing paddles 13 disposed on an axial shaft 17. The blades effect stirring and exposure of surface of the solid feed. It is preferred that the blades be closer together at the feed end 11 and farther apart at the discharge end 12 of the drum 10, thus providing more rapid stirring at the feed end, and slower travel at the discharge end, with greater time for completion of hydration at the later stages of treatment. Merely a few of the paddles are shown, to illustrate the device and its operation.

Active, calcined lime is fed in at port 14 from a suitable storage device 15 and the shaft and paddles are rotated by any suitable power source (not shown). Flow of feed to the hydrator 10 is controlled by valve 16. The lime is conveyed through drum 10 to discharge end 12, where it is removed as a hydrated, finely divided solid, through off-take chute 18, and can be received in a bin or other container.

Mix tank 19 receives water and the addition agent in desired proportions and is fitted with an agitator 20 operated by a motor (not shown) to provide thorough mixing. The mixed aqueous solution flows through pipe 21, flow being controlled by valve 22, and flows onto the incoming line. Dust and water and other vapor developed in the operation of this process are taken off through stack 23. A pipe 24 is disposed vertically adjacent stack 23 and spray inlet pipes 25 therefrom enter the interior of stack 23 through suitable apertures and in sealed relationship with the stack, to spray water into the dust-laden gases rising through the stack, washing the dusts and at least some of the water-soluble vapors out of such gases. The slurry of dust in wash water falls toward the bottom of the stack and is collected in collector 26 which is in general in the form of a frustrum of a cone, having a central opening 27 for the upward flow of the stack gases. The collected slurry passes out of the stack area through apertures 28 provided in the stack adjacent the base of the collector, into a weir 29 surrounding the stack 23. The slurry then flows out of the weir through pipe or conduit 30 and back into the hydrator 10, suitably at a point adjacent the base of pipe 21. By this mode of operation a further amount of hydrating water is provided from the stack washings to assist in obtaining complete hydration of the lime.

In order to illustrate the process and the product of this invention, the following examples describe more specifically certain embodiments thereof.

*Example 2*

Dolomite from a quarry at Natividad, California, is crushed and calcined to the active state, i.e., is heated in a rotary kiln to a calcining temperature of 1100° to 1200° C. The calcined product has the following typical analysis: 1.0% loss on ignition, 1.1% $SiO_2$, 0.6% $R_2O_3$ (including 0.3% $Fe_2O_3$ and 0.3% (by difference) $Al_2O_3$), 58.9% CaO and 38.4% (by difference) MgO. The calcined material is placed in a bin or receptacle, for instance such as shown at 15 on the drawing, and is further treated in a device such as shown in the annexed drawing, as described below.

A solution is prepared in receptacle 19 by adding 50 gallons of water and 5 gallons glycerol and thoroughly stirring by means of agitator 20. Valves 16 and 22 are opened to feed calcine and solution into drum 10, and rotation of shaft 17 and paddles 13 is begun. The solution contains 13.6% by weight glycerol and is fed in at a rate to provide about 0.1% by weight glycerol based on the weight of the hydrated product.

As hydration proceeds, the paddles 13 force the material toward the discharge end of the drum and the mass in the hydrator becomes heated because of the exothermic hydration reaction. Dust and vapors rise through stack 23 and water is sprayed into the stack at spray inlets 25, washing dust out of the stack gases. The dust and water slurry is collected in weir 29 as described above and flows down through pipe 30 and returns into the hydrator at aperture 31. The solids proceed forward somewhat more slowly toward the discharge end of the drum because the paddles 13 are spaced farther apart in that zone and this provides more time for the hydration reaction to go substantially to completion, although the product as discharged at 18 can contain from 6% to 8% of unhydrated material which, in the instance where dolomite lime is treated, may be predominantly magnesium oxide.

The hydrated product taken off at 18 is aged, or allowed to stand, for about 24 hours and, if desired, is thereafter ground to finely divided state, preferably about 95% passing through 325 mesh.

The hydrate so prepared, when made into a putty with about an equal weight of water and allowed to stand, or "aged," for 30 minutes, exhibits an equivalent sand-carrying capacity (by Voss apparatus) of 1:4.3. Another hydrate, prepared of the same calcine and in exactly the same manner, but without glycerol addition, has an equivalent sand-carrying capacity of only 1:3.75. The hydrate made according to the invention exhibits at least 50% increase in viscosity over that of hydrate made in exactly the same manner except that water alone, with no addition agent, is incorporated in the hydration step in drum 10.

*Example 2*

A batch of Natividad dolomite, as in Example 1, is calcined in the same manner as in that example and is also hydrated in the same manner except that instead of glycerol, there is prepared in Tank 19 a water solution containing 0.5% of a polyvinyl alcohol known in commerce as Elvanol 50–42. This product is sold by E. I. du Pont de Nemours & Co., and it is a water-soluble compound. This solution is introduced into the hydrator at a rate to provide 0.0013% Elvanol based on the weight of final product, the procedure otherwise being as described in Example 1. The product is aged, or allowed to stand, 24 hours and is then ground to finely divided state, preferaby 95% passing through 325 mesh (less than 44 microns).

The hydrate so obtained, when mixed with about an equal weight of water and allowed to stand, exhibits an equivalent sand-carrying capacity of 1 to over 4.1, and it exhibits an increase of viscosity of about 50% above that shown by a hydrate of the same starting material treated in the same manner except that water alone, without any addition agent, was used for hydrating in drum 10. Upon further standing, or aging, the hydrated lime according to this invention with polyvinyl alcohol additive, provides a still "fatter" lime and increases in viscosity at a higher rate of increase than the lime hydrated with glycerol. All of the properties of the polyvinyl alcohol-treated lime improve upon further aging.

In these and other tests made by hydrating calcined dolomite with sufficient water to ensure substantially complete hydration of the lime and magnesia contained therein, it has been found that thick, excellent putties of very good sand-carrying capacities are obtained when adding from 0.1% to 5.0% glycerol in the hydrating water. The sand-carrying capacity of the putty obtained in this manner has consistently been at least about 10% higher, after only about two hours aging time, than that of limes without additive or other special treatment which, in addition, require 12 to 24 hours' aging periods. Water retention of the hydrated lime putty is also increased about 10% by the use of glycerol as described above, over the water retention of lime hydrated without glycerol addition. Also, it has been found in these tests that a putty made from the same calcined dolomite hydrated in the same manner as described above, but without any alcohol or glycerol addition, is stiff and unworkable after only two hours aging of the putty, whereas the putties obtained according to the invention are workable and exhibit the aforementioned improved properties after aging for about two hours.

In still further series of tests, it has been found that the ranges of amounts of alcohols as given hereinabove are preferred, to provide an ultimate putty of good workability and good sand-carrying capacity after a short aging time, such as two hours. The sand-carrying capacity and water retention have consistently been at least about 10% higher than those of like putties made in the same manner except that no additive was incorporated in the hydrating water. The viscosities of the putties made according to the invention have increased from 30% to 200% over those of the like putties, but made without added alcohol or glycerol; while at the same time the putties according to the invention have been of good workability. The hydrated lime putties made according to the present invention exhibit freedom from popping and pitting when tested by A.S.T.M. method C110–57, and the plasticity of such hydrated lime putty is excellent.

Two test lots were taken from a batch of commercially prepared hydrated calcined dolomite. One lot, A, was mixed in the known manner with sufficient water to form a putty, aged for 24 hours and then tested for sand-carrying capacity. The other lot, B, was mixed with water in the same manner except that there was admixed with the water 1.5% methanol based on the weight of hydrate, and this lot was tested in the same manner as the first lot. The sand-carrying capacity of lot A was 1:4.5, and that of lot B, 1:4.75. In similar tests with the addition of glycerol in the puttying water, from 5% to 10% improvement is found in the sand-carrying capacity. Thus, while there is some improvement in the sand-carrying property of the hydrated lime when alcohol or glycerol is admixed therewith after hydration has been effected, it is preferred to admix the addition agent at the hydration step or stage because better results are obtained thereby.

In testing for sand-carrying capacity, a weighted amount of the hydrated material is mixed with sufficient water to form a thick paste and the paste is allowed to stand for 30 minutes, or whatever time is desired. Ottawa sand, passing 20 mesh and retained on 30 mesh, is weighed out in an amount equal to approximately the sand-carrying ratio expected, e.g., five times the weight of the lime hydrate, and one-half of this amount is added to the hydrate paste and stirred for 30 seconds, then the remainder of the sand is added and mixing continued for 1.25 mins. When proper normal consistency is attained the material is placed in a standard Voss apparatus and extruded until a pressure of 60 pounds is reached, at which time extrusion stops. The depth of the column of mix remaining in the Voss apparatus is measured and its percentage of the total test depth is calculated. This percentage of the amount of sand originally added is then also calculated and the result is expressed as the sand-carrying capacity, as given in the above-described test results.

In common with the usual practice in this art, the chemical composition of the material is given in terms of the various oxides, e.g., CaO, SiO$_2$, although it is to be understood that the elements in question may be present in combination with other components of the material, for instance, as a calcium silicate. The calcination of dolomite or limestone substantially converts the materials to calcium and magnesium oxides and to calcium oxide, respectively. In the hydration step or stage, the corresponding hydroxides are formed, and the calcium hydroxide is referred to herein as lime hydrate, hydrated lime, etc., although it will be understood that Mg hydroxide is also present in the material from dolomite. The hydrated lime prepared as described in the examples is discharged from the hydrating zone in substantially dry state. In making the hydrated lime putties further amounts of water are added to the dry hydrate to form such putties. The calcined dolomite or lime can be crushed or ground to any desired particle size, but this comminution is generally not necessary because the particles fed to the hydrator break down further under the action of hydration and stirring. In the hydration step, a slight excess of water is added over what is sufficient to form the hydrate and this practice is usual in this art, a substantially dry hydrate being produced; but at least sufficient water is added to form a dry hydrate. Although polyvinyl alcohol has been shown in a specific example above, it will be understood that other water-soluble resin alcohols will be useful herein.

The above examples and specific description have been given for purposes of illustration only and it will be understood that variations and modifications can be made therein without departing from the spirit and scope of the appened claims.

Having now described the invention, what is claimed is:

1. Hydrated lime of improved plasticity and sand-carrying capacity consisting essentially of hydrated lime and a small amount of at least one water-soluble substance chosen from the group consisting of a lower molecular weight aliphatic alcohol containing not over eight carbon atoms, glycerol and resin alcohol.

2. Hydrated lime of improved plasticity and sand-carrying capacity consisting essentially of hydrated lime and from 0.0005% to 10% of at least one water-soluble substance chosen from the group consisting of a lower molecular weight aliphatic alcohol containing not over eight carbon atoms, glycerol and resin alcohol.

3. Hydrated lime of improved plasticity and sand-carrying capacity consisting essentially of hydrated lime and from 0.5% to 3.0% of methanol in intimate admixture therewith.

4. Hydrated lime of improved plasticity and sand-carrying capacity consisting essentially of hydrated lime and from 1% to 7.5% of ethyl alcohol in intimate admixture therewith.

5. Hydrated lime of improved plasticity and sand-carrying capacity consisting essentially of hydrated lime and from 0.1% to 3.75% glycerol.

6. Hydrated lime as in claim 5, containing from 0.1% to 2.0% of said glycerol.

7. Hydrated lime of improved plasticity and sand-carrying capacity consisting essentially of hydrated lime and from 0.0005% to 0.005% of water soluble polyvinyl alcohol.

8. Method of producing hydrated lime to provide a quick-aging hydrated lime of improved sand-carrying capacity and improved plasticity comprising admixing with calcined, active lime, sufficient water to hydrate said lime completely, and a small amount of at least one substance chosen from the group consisting of a lower molecular weight aliphatic alcohol containing not over eight carbon atoms, glycerol and water-soluble resin alcohol.

9. Method of producing hydrated lime to provide a quick-aging hydrated lime of improved sand-carrying capacity and improved plasticity comprising preparing a water solution containing from 0.0005% to 10% of at least one substance chosen from the group consisting of a group of a lower molecular weight aliphatic alcohol containing not over eight carbon atoms, glycerol and water-soluble resin alcohol, said weight being based on the total amount of dry hydrated lime, and admixing said water solution and calcined reactive lime to form hydrated lime.

10. Method as in claim 9, wherein there is admixed a water solution containing from 0.5% to 3% of methyl alcohol, based on the weight of hydrated lime.

11. Method as in claim 9, wherein there is admixed a water solution containing from 1% to 7.5% of ethyl alcohol, based on the weight of hydrated lime.

12. Method as in claim 9, wherein there is admixed a water solution containing from 0.1% to 3.75% glycerol, based on the weight of hydrated lime.

13. Method as in claim 9, wherein there is admixed a solution containing from 0.1% to 2% glycerol, based on the weight of hydrated lime.

14. Method as in claim 9, wherein there is admixed a solution containing from 0.0005% to 0.005% water soluble polyvinyl alcohol, based on the weight of hydrated lime.

15. Hydrated dolomitic lime adapted to provide a dolomitic lime putty of accelerated aging time and improved sand-carrying capacity containing in intimate admixture therewith about 0.1% by weight of glycerol.

16. Hydrated dolomitic lime adapted to provide a dolomitic lime putty of accelerated aging time and improved sand-carrying capacitiy containing in intimate admixture therewith about 0.0013% by weight of water-soluble polyvinyl alcohol.

References Cited in the file of this patent
UNITED STATES PATENTS

| | | |
|---|---|---|
| 1,998,667 | Fritz | Apr. 23, 1935 |
| 2,423,335 | Minnick | July 1, 1947 |

OTHER REFERENCES

"Plasticizers" by Buttrey, second ed., 1957, page 41.

UNITED STATES PATENT OFFICE
CERTIFICATE OF CORRECTION

Patent No. 3,120,444                                February 4, 1964

Harold J. Dunton et al.

It is hereby certified that error appears in the above numbered patent requiring correction and that the said Letters Patent should read as corrected below.

Column 3, line 45, for "Example 2", in italics, read -- Example 1 --, in italics; column 4, line 46, after "lime" insert -- made --.

Signed and sealed this 5th day of October 1965.

(SEAL)
Attest:

ERNEST W. SWIDER                                EDWARD J. BRENNER
Attesting Officer                                     Commissioner of Patents